United States Patent
Wu et al.

(10) Patent No.: US 8,784,674 B2
(45) Date of Patent: Jul. 22, 2014

(54) METHOD OF MAKING A PMR WRITER WITH GRADED SIDE SHIELD

(71) Applicant: Headway Technologies, Inc., Milpitas, CA (US)

(72) Inventors: Yan Wu, Cupertino, CA (US); Zhigang Bai, Milpitas, CA (US); Moris Dovek, San Jose, CA (US); Cherng-Chyi Han, San Jose, CA (US); Min Li, Fremont, CA (US); Jianing Zhou, Fremont, CA (US); Jiun-Ting Lee, Sunnyvale, CA (US); Min Zheng, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/098,598

(22) Filed: Dec. 6, 2013

(65) Prior Publication Data

US 2014/0091055 A1    Apr. 3, 2014

Related U.S. Application Data

(62) Division of application No. 12/799,131, filed on Apr. 19, 2010, now Pat. No. 8,611,046.

(51) Int. Cl.
| | |
|---|---|
| *B44C 1/22* | (2006.01) |
| *G11B 5/127* | (2006.01) |
| *G11B 5/31* | (2006.01) |
| *G11B 5/105* | (2006.01) |

(52) U.S. Cl.
CPC .............. *G11B 5/105* (2013.01); *G11B 5/1278* (2013.01); *G11B 5/3163* (2013.01); *G11B 5/315* (2013.01); *G11B 5/3116* (2013.01)

USPC ................... 216/22; 216/63; 216/67; 216/74; 360/125.3

(58) Field of Classification Search
None
See application file for complete search history.

(56) References Cited

U.S. PATENT DOCUMENTS

| | | | |
|---|---|---|---|
| 5,996,213 A * | 12/1999 | Shen et al. .................. | 29/603.15 |
| 7,068,453 B2 | 6/2006 | Terris et al. | |
| 7,322,095 B2 | 1/2008 | Guan et al. | |
| 7,367,112 B2 | 5/2008 | Nix et al. | |
| 7,441,325 B2 | 10/2008 | Gao et al. | |
| 7,558,020 B2 | 7/2009 | Sasaki et al. | |
| 8,004,794 B2 * | 8/2011 | Zhou et al. ............... | 360/125.31 |
| 2006/0044682 A1 * | 3/2006 | Le et al. ......................... | 360/126 |
| 2009/0052092 A1 | 2/2009 | Zhou et al. | |
| 2009/0091862 A1 | 4/2009 | Han et al. | |
| 2009/0154019 A1 | 6/2009 | Hsiao et al. | |
| 2009/0154026 A1 | 6/2009 | Jiang et al. | |
| 2009/0236307 A1 * | 9/2009 | Okada et al. ..................... | 216/22 |
| 2009/0255899 A1 * | 10/2009 | Le .................................. | 216/22 |

* cited by examiner

*Primary Examiner* — Binh X Tran
*Assistant Examiner* — David Cathey, Jr.
(74) *Attorney, Agent, or Firm* — Saile Ackerman LLC; Stephen B. Ackerman

(57) ABSTRACT

A perpendicular magnetic recording (PMR) head is fabricated with a pole tip shielded laterally by a graded side shield that is conformal to the shape of the pole tip at an upper portion of the shield but not conformal to the pole tip at a lower portion. The shield includes a trailing shield, that is conformal to the trailing edge of the pole tip and may include a leading edge shield that magnetically connects two bottom ends of the graded side shield.

20 Claims, 3 Drawing Sheets

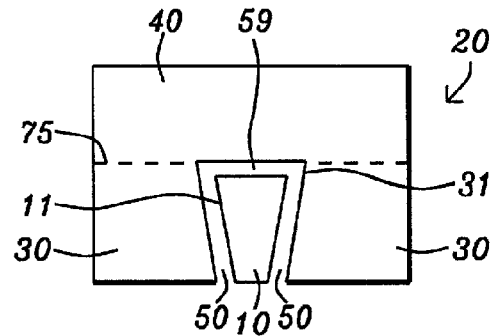
FIG. 1a – Prior Art
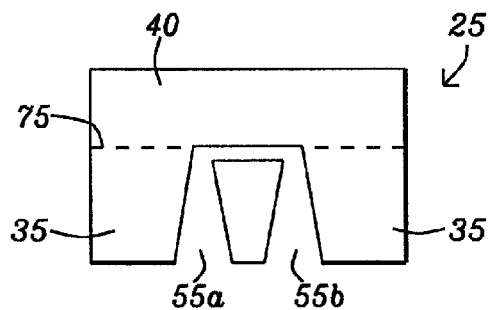
FIG. 1b – Prior Art
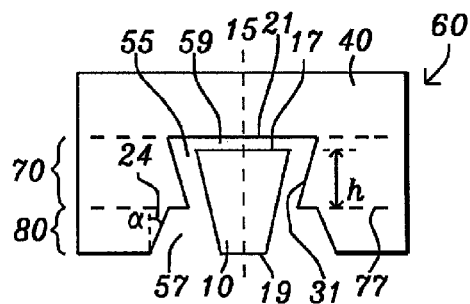
FIG. 2a
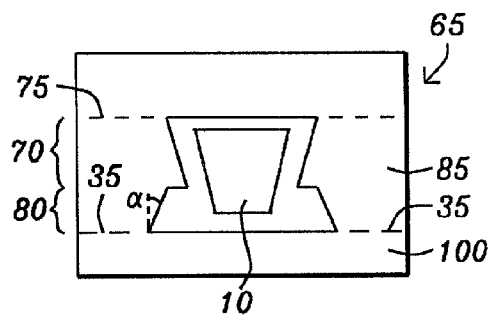
FIG. 2b

METHOD OF MAKING A PMR WRITER WITH GRADED SIDE SHIELD

This is a Divisional application of U.S. patent application Ser. No. 12/799,131 filed on Apr. 19, 2010, which is herein incorporated by reference in its entirety and assigned to a common assignee.

BACKGROUND OF THE INVENTION

1. Field of the Invention

This invention relates to the fabrication of a perpendicular magnetic recording (PMR) write head whose main pole is at least partially surrounded by shields formed of magnetic material. In particular it relates to such a head that is shielded at its sides by shields that are non-conformal to the shape of the main pole.

2. Description of the Related Art

The increasing need for high recording area densities (up to 500 Gb/in$^2$) is making the perpendicular magnetic recording head (PMR head) a replacement of choice for the longitudinal magnetic recording head (LMR head).

By means of fringing magnetic fields that extend between two emerging pole pieces, longitudinal recording heads form small magnetic domains within the surface plane of the magnetic medium (hard disk). As recorded area densities increase, these domains must correspondingly decrease in size, eventually permitting destabilizing thermal effects to become stronger than the magnetic interactions that tend to stabilize the domain formations. This occurrence is the so-called superparamagnetic limit. Recording media that accept perpendicular magnetic recording, allow domain structures to be formed within a magnetic layer, perpendicular to the disk surface, while a soft magnetic underlayer (SUL) formed beneath the magnetic layer acts as a stabilizing influence on these perpendicular domain structures. Thus, a magnetic recording head that produces a field capable of forming domains perpendicular to a disk surface, when used in conjunction with such perpendicular recording media, is able to produce a stable recording with a much higher area density than is possible using standard longitudinal recording.

Since their first use, the PMR head has evolved through several generations. Initially, the PMR head was a monopole, but that design was replaced by a shielded head design with a trailing edge shield (TS), which provides a high field gradient in the down-track direction to facilitate recording at high linear densities. Side shields (SS) then began to be used in conjunction with the trailing edge shields, because it was necessary to eliminate the fringing side fields in order to increase writing density still further. To further reduce the fringing in the down-track direction, thus reducing the length of the write bubble down the track and improving write performance at a skew angle, an optional leading edge shield (LS) was also proposed, making the write head four-side shielded.

Referring to FIG. 1a, there is shown an ABS (air bearing surface) planar view of a prior art PMR writer with a main pole (10) shielded in a (partial) wrap-around manner by a shield (20) that has two symmetrically disposed side portions (30) (hereinafter called a side shield (SS)) and a trailing edge portion (40) (hereinafter called a trailing shield (TS)). Note that a horizontal dashed line (75) indicates an imaginary boundary between the upper portion of the shield that may be considered the trailing edge portion (40) and the two laterally disposed portions (30), continuous with the trailing edge portion (40), taken together, will be considered the side shield (SS). The trailing shield (TS) (40) provides a down-track field gradient for improved writing at higher areal density and the side shield (SS) restricts the fringing of the magnetic field, thereby improving the adjacent track erasure (ATE) performance. Typically a write gap material (59) fills the space between TS and main pole.

As can be seen in this ABS view, the inner edges (31) of SS are shaped to be conformal with the sides (11) of the main pole, producing a generally uniform gap (50) between the inner edges of the shields and the lateral sides (11) (outer surfaces) of the main pole. For simplicity, we shall call such a shield configuration "conformal to the main pole", symbolized iSS.

Conformality is here (and hereinafter) meant to indicate the fact that when viewed in the ABS plane, edges or edge portions (31) of the inner surface of the shield (its inner periphery) have the same shape as the outer edges of the main pole and are typically parallel to, but displaced from the pole itself so as to produce a uniform spacing between the pole and the shield. A non-conformal portion of the shield would encompass a portion of its inner edge (inner periphery) that is not of a similar shape to that of the pole, that is displaced from the pole in a horizontal (or vertical) direction and, therefore, is characterized by a non-uniform spacing between the shield inner periphery and the outer edges of the pole.

Referring next to FIG. 1b, there is shown an ABS (air bearing surface) view of a prior art PMR writer with a main pole (10) partially shielded in a wrap-around manner by a shield (25) that has a symmetrically disposed side shield (SS) portion (35) and a trailing edge portion (40) (hereinafter called a trailing shield (TS)). Note that a horizontal dashed line (75) indicates the imaginary boundary between the portion of the shield that may be considered the TS (40) and the laterally disposed portions (35) that, taken together, may be considered the SS. Unlike the shield configuration of FIG. 1a, this configuration has a side shield that is not conformal to the main pole, producing generally non-uniform side gaps (55a, 55b). We shall describe such a shield as being "non-conformal to the main pole," symbolized NCiSS. The NCiSS structure produces a higher strength field than the iSS structure, whereas the iSS structure has less side fringing due to the closeness of the side shields.

An additional issue with the NCiSS is that the shape of the SS is defined by a separate photo-mask process after the main pole shaping process has occurred. Due to the difficulty in aligning two separate masks, the left and right side gaps (55a) and (55b), will generally not be symmetric. The iSS configuration does not have this problem because the SS are self-aligned with the main pole allowing an atomic layer deposition (ALD) process to create a symmetric gap.

It is therefore the object of this invention to address the issues caused by shield asymmetries and non-uniformities and their effect on on-track and off-track performance.

Issues relevant to shield materials are described in the prior arts. For example, Terris et al. (U.S. Pat. No. 7,068,453) discloses side and trailing shields formed of a soft magnetic material.

Gao et al. (U.S. Pat. No. 7,441,325) discloses a trailing shield formed of NiFe.

Nix et al. (U.S. Pat. No. 7,367,112) teaches the formation of a main pole with trailing and side shields.

Guan et al. (U.S. Pat. No. 7,322,095, assigned to the present assignee) teaches a wrap-around shield, as do Jiang et al. (US Patent Application 2009/0154026) and Hsiao et al. (US Patent Application 2009/0154019).

Sasaki et al. (U.S. Pat. No. 7,558,020) discloses a trench etched in alumina and filled with a magnetic layer to form the main pole.

Han et al. (US Patent Application 2009/0091862) teaches conformal side shields around the main pole. This Application is assigned to the same assignee as the present invention.

Zhou et al. (US Patent Application 2009/0052092) teaches that the insulating layer through which the main pole is etched can be alumina or silicon dioxide. This Application is assigned to the same assignee as the present invention.

None of the prior art cited above address the problem addressed by the present invention nor do they disclose the structures and materials of the present invention.

SUMMARY OF THE INVENTION

A first object of this invention is to design and fabricate a shield configuration that improves both the on-track and off-track performance of a PMR write head.

A second object of the present invention is design and fabricate a PMR write head shield that avoids the side gap asymmetries that characterize non-conformal-to-main pole shields (NCiSS).

A third object of the present invention is to satisfy the first two object with either a shield that partially surrounds the main pole or completely surrounds (wraps around) the main pole.

These objects will be achieved by means of a partially or completely wrap-around shielded write head whose main pole (MP) is surrounded on its sides and trailing edge, or its sides and both its leading and trailing edges, by a graded shield that is conformal to the MP at its top (trailing edge) portion yet is non-conformal to the MP at its bottom (leading edge) portion.

The graded shield can be advantageously made by replacing the typical alumina substrate ($Al_2O_3$) having a cavity within which the main pole is formed, by a bi-layer substrate, formed of $MO/Al_2O_3$, where MO symbolizes an oxide different from $Al_2O_3$, for example $SiO_2$, (where M=Si) which can be etched by RIE (reactive ion etch) together with the $Al_2O_3$ but is selective against a chemical etch of the $Al_2O_3$ using an etchant such as EDTA (Ethylene Diamine Tetraacetic Acid).

Referring to FIGS. 2a and 2b, there are shown schematic ABS views of a partially surrounding PMR shield that will satisfy the objects of the present invention (FIG. 2a) and a completely surrounding PMR shield that will also satisfy the objects of the present invention (FIG. 2b).

FIG. 2a shows the ABS shape of a main write pole (MP) (10) that is partially surrounded (top and sides) by a shield (60). The ABS cross-sectional shape of the pole here is substantially trapezoidal and is symmetric about a perpendicular bisector (15) of its top (17) and bottom (19) edges, but is not symmetric about a horizontal axis (77) that is perpendicular to the vertical bisector.

The top portion of the shield (40), which is above the horizontal dashed line (75), includes within the inner edge of its opening (21) the top edge, or trailing edge, (17) of the pole. We may call this portion the trailing edge portion of the shield, denoted TS. The side portion of the shield, denoted SS, which is below TS, is formed of two portions, (70) and (80). Portion (70) is between the two horizontal dashed lines (75) and (77). It has inner edges (31) that are conformal to the pole in the region between (75) and (77), producing a uniform side gap (55) on either side of the pole in that region. The bottom portion of the side shield (80), the portion that is below horizontal line (77), includes within the inner periphery of its opening a portion below the horizontal axis (77) that is not conformal to the pole, producing a non-uniform side gap (57). We shall denote this SS a graded side shield.

The vertical height of the portion of the main pole that is conformally surrounded by the shield is denoted h, which can be between 20% and 80% of the entire height of the pole tip. The side edge of the bottom portion of the side shield makes an angle α (24) with the vertical (15), which can be anything between 0° and 30°.

The ABS shape of the pole tip in this example is a symmetric trapezoid whose two parallel sides are the (narrower) leading edge (19) and (wider) trailing (17) edge and whose two, equal length non-parallel sides are the tapered sides of the pole. The trapezoid, as already noted, is symmetric about the line (15) bisecting the two parallel sides. The separation between the inner edge of the upper portion of the shield (21) and the trailing edge of the pole (17) is called the write gap (59) and it is typically between approximately 15 and 40 nanometers (nm) in width.

The bottom portion (80) of the side shield, is not conformal to the main pole. The portion of the MP that is surrounded conformally (70) has a height h, which can be between approximately 20% and 80% of the total height of the MP, denoted MPh. The non-conformal lower portion of the SS (80) makes an angle, α, (24) with the vertical (15), which angle can be between approximately 0° and 30°. The space between the side shield (SS) and the side edges of the pole tip is called the side gap and it is typically between approximately 30 and 200 nm in width.

Referring now to schematic FIG. 2b, there is shown a graded shield (65) that completely surrounds a main pole (10) that is substantially the same as the main pole of FIG. 2a. This shield can be thought of as the partially surrounding graded shield of FIG. 2a, to which a leading edge shield (100) has been added (below horizontal dashed line segments (85)) so as to physically and magnetically connect the lower ends of the two SS (35) at the positions of the dashed line segments.

Like the shield of FIG. 2a, the completely surrounding graded shield (65) is conformal to the main pole along the inner edge of a top portion (70), but is non-conformal along the inner edge of a lower portion (80). Again, like the shield of FIG. 2a, the height of the main pole portion that is conformally shielded is h, which can vary between approximately 20% and 80% of the entire main pole height, denoted MPh, (MPh=distance between its upper (17) and lower (19) edges). Similarly the angle, α, by which the lower portion of the shield deviates from the vertical (i.e., angle between the inner edges of the shield and the vertical bisector of the pole tip) and, creates the non-conformality, is between approximately 0° and 30°.

Referring to FIG. 3 and FIG. 4, there are shown graphical results of simulations to compare the results of using a writer shielded with prior art conformal side shields (iSS) (horizontal dashed line), with the results using the graded side shields of the present invention.

FIG. 3 plots on the vertical scale the maximum vertical field ($H_{y\,max}$) in Oe and on the horizontal scale the height h in nm as defined above. The side gap width is 80 nm.

FIG. 4 is a plot of the overwrite (OW) at a fixed 80 nm erase width vs. h. Side gap width is 80 nm as in FIG. 3. Both the overwrite and the field increase as h decreases.

BRIEF DESCRIPTION OF THE DRAWINGS

FIG. 1a is a schematic ABS view of a main pole tip of a PMR write head that is partially surrounded by a prior art type shield that is conformal to the shape of the main pole tip.

FIG. 1b is a schematic ABS view of a main pole tip of a PMR write head that is partially surrounded by a prior art type shield that is not conformal to the shape of the main pole tip.

FIG. 2a is a schematic illustration of an embodiment of the present graded shield invention, showing a partially shielded PMR write head with shields that are conformal along an upper portion of the main pole and non-conformal along a lower portion.

FIG. 2b is a schematic illustration of an embodiment of the present graded shield invention, showing a completely shielded PMR write head with shields that are conformal along an upper portion of the main pole and non-conformal along a lower portion.

DESCRIPTION OF THE PREFERRED EMBODIMENTS

The preferred embodiment of the present invention is a graded shield and its method of formation. The graded shield may partially or completely surround the main pole of a PMR write head. The shield is termed "graded" to denote a sense that its shape changes from a portion that is conformal to the main pole to a portion that is non-conformal, thereby providing in a unique way at least the advantages normally associated with both prior art conformal shields and prior art non-conformal shields. The parameters describing the degree of gradation are h, the height of that portion of the pole tip that is conformally surrounded and α, the angle with respect to vertical made by the side shield along that portion that is non-conformal with the main pole. The characteristics of the graded shield will now be further elucidated by reference to a process flow sequence by which it may be fabricated.

Figure 3:
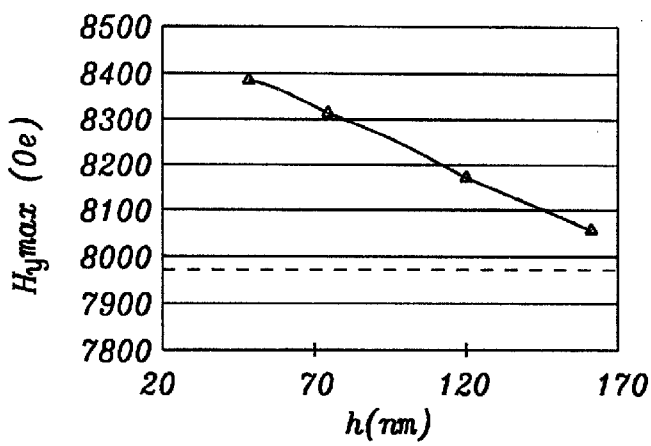
FIG. 3 is a schematic graphical representation of the comparison of maximum vertical field vs. h (the height of the main pole that is conformally shielded) for the performance of a prior art conformally shielded writer (shown as a horizontal dashed line) and an embodiment of the graded shield of the present invention.
Figure 4:
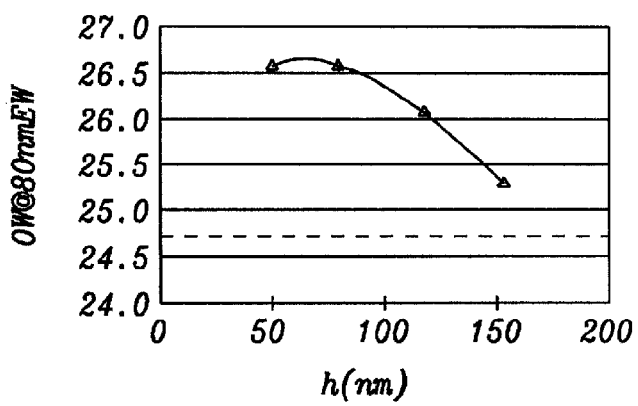
FIG. 4 is a schematic graphical representation of the comparison of overwrite (OW) performance as a function of h (the height of the main pole that is conformally shielded) of a prior art conformally shielded writer (shown as a horizontal dashed line) and an embodiment of the graded shield of the present invention.
Figure 5A:
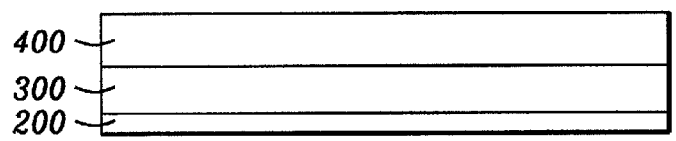
FIGS. 5a-g are a series of schematic illustrations showing an embodiment of a process flow by which the graded shield write head of the present invention may be fabricated.

Referring first to FIG. 5a there is shown the deposition of a bi-layer dielectric substrate, which will serve to create a cavity within which to plate a main pole and surrounding graded side shields. The bi-layer is itself formed on a substrate, which in this embodiment is a RIE (reactive ion etch) etch-stop layer (200), such as a layer of Ru formed to a thickness of between approximately 20 and 200 nm. As we shall note later, the substrate can also be a lower shield on which the side shields, SS, and trailing shield TS are formed.

On this substrate layer (200) is then formed the bi-layer, which is a first layer formed of an oxide, denoted MO, where M is the element to be oxidized (other than Al). In this case, MO is an oxide of Si (i.e., M=Si) namely $SiO_2$ (300) formed to a thickness between approximately 20 and 150 nm. On the layer of $SiO_2$ is then formed a layer of $Al_2O_3$, (400), to a thickness between approximately 150 and 400 nm to complete the bi-layer. It is noted that the lower layer (300) is deposited to a thickness that is at least the main pole height, MPh, minus h (MPh-h), whereas the upper layer (400) is deposited to a thickness that is at least the write gap thickness, WG, plus h, (WG+h), where h is the previously defined height of the pole that is conformally surrounded by the side shields.

Figure 5B:
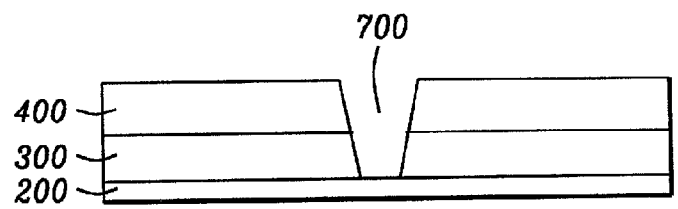

Referring next to FIG. 5b, there is shown a schematic illustration of the fabrication of FIG. 5a now having a cavity (700) etched within it, using a RIE process. The cavity is etched through layers (400) and (300) and terminates at layer (200). In this embodiment, the cavity is formed with a symmetric trapezoidal vertical cross-sectional shape, which is substantially the desired cross sectional shape of the main pole tip at its ABS emergent surface. However, other cross-sectional shapes could be envisioned. The width of the cavity at its widest point is approximately between 0.2 and 0.4 microns (μm) and its width at the substrate (200) is between approximately 0 and 0.2 μm.

Figure 5C:
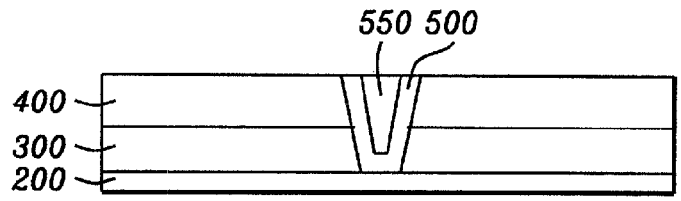

Referring next to FIG. 5c, there is shown the cavity of FIG. 5b now lined with a non-magnetic, metallic layer, which in this embodiment is a layer of Ru (500) of thickness between approximately 40 nm and 120 nm. The lined cavity is then filled with a layer of CoFe (550) or other magnetic alloy such as FeNi or CoNiFe to form the main pole tip. The upper surface of the filled cavity is then planarized using a method such as CMP, to reduce the overall thickness (MPh) of the pole tip to between approximately 50 and 200 nm and to leave a smooth and planar upper surface as shown schematically in the figure. At this point in the fabrication, the upper surface of the magnetic pole (10) may be tapered (thinned in a direction towards the ABS) at its trailing edge (upper edge in this figure) by means of ion beam milling.

Figure 5D:
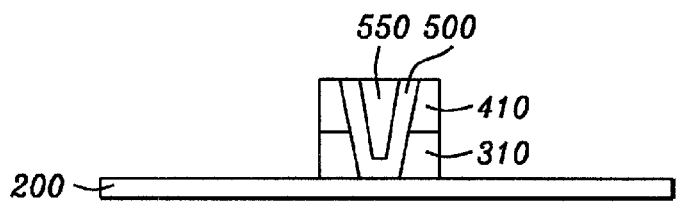

Referring next to FIG. 5d, there is shown the fabrication of FIG. 5c with portions of the substrate laterally disposed about the cavity having been completely removed by an etching process such as a reactive ion etch (RIE), which is essentially the same as the etching process used to create the cavity. The etching process can be implemented by means of a photomask placed over the cavity. The etch can be controlled by tuning the RIE condition to produce a range of angles α, between 0° (shown here) and 30°, the tuning being accomplished by adjusting such parameters as plasma power, gas flow rate, etc.

Subsequent to the etch, the cavity remains surrounded by remnants of substrate, including an $Al_2O_3$ portion (410) and a $SiO_2$ portion (310) whose lateral widths will finally determine the shape of the shields to be formed.

Figure 5E:
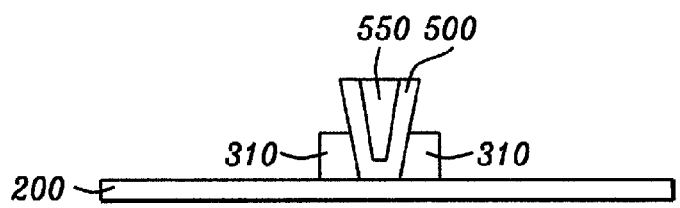

Referring now to schematic FIG. 5e, there is shown the results of a wet etch used to remove remnant portion (410), but to leave remnant portion (310). The wet etch can be accomplished using an etching solution such as EDTA (Ethylene Diamine Tetra-acetic Acid).

Figure 5F:
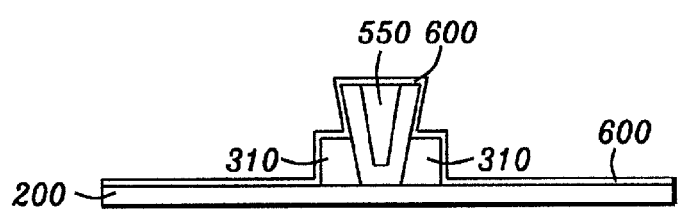

Referring now to FIG. 5f, there is shown schematically the deposition of a write gap layer (600), which is a layer of non-magnetic material such as $Al_2O_3$, $SiO_2$ or Ru, deposited to a thickness of between approximately 15 nm and 100 nm. Preferably, the method of deposition is ALD (Atomic Layer Deposition) or CVD (Chemical Vapor Deposition).

Figure 5G:
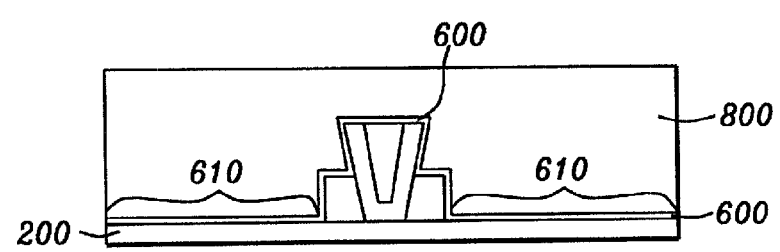

Referring finally to schematic FIG. 5g, there is shown the fabrication of FIG. 5f with the addition of a plated layer (800) conformally covering the write gap layer and serving as a combined side shield/trailing shield structure. It is to be noted that if it is desired to form a lower (leading edge) shield (as shown in FIG. 2b) so as to completely enclose the magnetic pole, the substrate layer (200) would be an already formed leading edge shield on which the bi-layer, (300)/(400) of FIG. 5a, is then directly formed. Since a good magnetic contact is preferred between the leading edge shield and the side shield, the write gap layer (600) would be patterned so that a direct contact between the leading edge shield and the side shields is obtained. The patterning can be provided by depositing the write gap layer using a lift-off mask or by depositing the layer conformally over the entire leading edge shield and then removing laterally disposed portions (610) by an IBE process while protecting the already formed main pole with a photoresist mask.

As is understood by a person skilled in the art, the preferred embodiment of the present invention is illustrative of the present invention rather than limiting of the present invention. Revisions and modifications may be made to methods, materials, structures and dimensions employed in forming and providing a PMR head having a main pole-tip surrounded by graded magnetic shield configuration, while still forming and providing such a PMR head and pole and its method of formation in accord with the spirit and scope of the present invention as defined by the appended claims.

What is claimed is:

1. A method of forming a pole tip shielded by a graded side shield, comprising:

providing a substrate;

forming on said substrate a dielectric bilayer having a lower dielectric layer of a first material and a first thickness and an upper dielectric layer of a second material and a second thickness;

using a first etch process, creating a first cavity in said bilayer, wherein said first cavity has an upper opening at the upper surface of said bilayer and a lower opening at an upper surface of said substrate, wherein said lower opening is narrower than said upper opening and wherein said first cavity is formed with a vertical cross-section having diminishing horizontal width in a downward vertical direction towards said substrate, and wherein said first cavity is substantially mirror symmetric about a vertical bisector of said upper opening; then coating the interior of said first cavity with a non-magnetic metallic coating of uniform width, wherein said coating creates a second cavity within said first cavity, wherein said second cavity is substantially congruent to said first cavity; then filling said second cavity with a magnetic material, forming thereby a main magnetic pole; then planarizing said upper surface of said dielectric bilayer, thereby removing excess of said magnetic material; then optionally milling an upper surface of said main magnetic pole to form a tapered edge in a direction transverse to said vertical cross-section; then using a photomasking and second etch process, etching vertically downward, at an angle α to the vertical, to said substrate to remove all portions of said dielectric bilayer laterally disposed from said first cavity to expose said substrate, leaving a small residual portion of said bilayer extending laterally outward from each side of said first cavity and extending downward to said substrate; then using a third etch process, removing said upper dielectric layer of said residual portion, exposing, thereby an upper portion of said non-magnetic metallic layer; then depositing a layer of write gap material to conformally cover the fabrication; then plating a blanket layer of magnetic material over said write gap layer, whereby said blanket layer of magnetic material creates a shield having a conformal upper portion and a graded side portion.

2. The method of claim 1 wherein each of said first and second etches is an RIE etch.

3. The method of claim 1 wherein said third etch is a wet etch that selectively removes material forming said upper layer.

4. The method of claim 1 wherein said substrate is an etch-stop layer formed of Ru that is resistant to said RIE etch.

5. The method of claim 1 wherein said substrate is a lower magnetic shield.

6. The method of claim 1 wherein said lower dielectric layer is a layer of MO, where M is an element other than the element to be oxidized in forming said upper dielectric layer.

7. The method of claim 6 wherein said lower dielectric layer is a layer of $SiO_2$.

8. The method of claim 1 wherein said upper dielectric layer is a layer of $Al_2O_3$.

9. The method of claim 8 wherein using said third etch process, said layer of $Al_2O_3$ is selectively etched by EDTA.

10. The method of claim 1 wherein said coating of non-magnetic metallic material is a layer of Ru formed to a thickness between approximately 40 nm and 120 nm.

11. The method of claim 1 wherein said first cavity is formed with a trapezoidal cross-sectional shape.

12. The method of claim 1 wherein said second thickness is at least the sum of the thickness of said write gap material and h, wherein h is between 20% and 80% of the height of said pole tip.

13. The method of claim 1 wherein said first thickness is at least the height of the main magnetic pole, MPh, minus h, wherein h is between 20% and 80% of the height of said pole tip.

14. The method of claim 1 wherein said angle α is between greater than 0° and 3°.

15. The method of claim 2 wherein said angle α is created by adjusting said second etch process by increasing the power of the RIE etch or adjusting the flow rate of reactant gasses.

16. The method of claim 1 wherein said layer of write gap material is a layer of $Al_2O_3$ of Ru, deposited to a thickness up to approximately 100 nm by a method of atomic layer deposition or chemical vapor deposition.

17. The method of claim 1 wherein the width of the upper opening of said cavity is between approximately 0.2 and 0.4 microns and the width of its lower opening is between greater than 0 and 0.2 microns.

18. The method of claim 5 wherein said depositing a layer of write gap material to conformally cover the fabrication further includes a patterning of said write gap material to enable a magnetic contact between said substrate and said blanket layer of magnetic material subsequently plated over said fabrication.

19. The method of claim 18 wherein said patterning includes a removal of portions of said write gap material laterally disposed peripherally to said small residual portion of said bilayer whereby said blanket layer of magnetic material may directly contact said substrate.

20. The method of claim 18 wherein said patterning includes a deposition of said write gap layer using a lift-off stencil, whereby said write gap layer is not formed over regions of said substrate peripherally disposed to said small residual portion of said dielectric bilayer whereby said blanket layer of magnetic material may directly contact said substrate.

* * * * *